… …

United States Patent Office 3,772,315
Patented Nov. 13, 1973

3,772,315
PROCESS FOR THE PRODUCTION OF
2-ACYLIMIDAZOLES
Erik Regel, Wuppertal-Cronenberg, and Karl-Heinz Buchel, Wuppertal-Elberfeld, Germany, assignors to Bayer Aktiengesellschaft, Leverkusen, Germany
No Drawing. Filed May 18, 1970, Ser. No. 38,598
Claims priority, application Germany, May 22, 1969, P 19 26 206.7; Nov. 12, 1969, P 15 56 711.4
Int. Cl. C07d 49/36, 49/38
U.S. Cl. 260—296 R     4 Claims

ABSTRACT OF THE DISCLOSURE

The invention relates to 2-acyl-1-alkyl- or -aryl-imidazoles, wherein the 4- and 5-positions of the imidazole ring as well as the 1-alkyl or -aryl substituent may be substituted, which, in the form of their acid addition salts, possess fungicidal activity, and which are also useful as intermediates in further syntheses. The invention also provides a process for producing such compounds by acylation of the corresponding imidazole, unsubstituted in the 2-position, with the appropriate acid halide.

---

The present invention relates to 2-acyl-1-alkyl- or -aryl-imidazoles which, in the form of their acid addition salts, possess fungicidal activity and to a process for their preparation.

It is known that imidazole ketones in general are very difficult to obtain, since imidazoles cannot be subjected to a Friedel-Crafts synthesis (see K. Hofmann: The Chemistry of Heterocyclic Compounds 1953). Thus, 2-benzoylimidazole is prepared by subjecting 2-benzylimidazole to a chromic acid oxidation (see Chem. Ber. 66, 1900 (1933)). If an attempt is made to acylate imidazoles with acylating agents, the hydrogen atom at the nitrogen is first replaced. In addition, however, various by-products are formed by side reactions whose mechanism is not clear.

It is accordingly an object of the present invention to provide certain novel imidazole ketones, i.e. acylimidazoles, and to provide new processes for their preparation.

In accordance with the invention there are provided acylimidazoles of the formula

(I)

in which
R is tertiary alkyl; halo-, nitro- or amino-alkyl; alkoxy; alkylthio; aryloxy; arylthio; dialkylamino; or phenyl, biphenyl, naphthyl, cycloalkyl, cycloalkenyl, pyridyl, pyrazolyl, oxazolyl, thiadiazolyl, furyl or thienyl, optionally substituted by one or more halo-, nitro-, amino-, alkoxy-, hydroxy- or alkyl groups, or
the radical of the formula

(II)

in which
A is a direct bond, —CO—, —COCH$_2$— or —COC$_6$H$_4$—,
R' is an alkyl, aryl or aralkyl radical which may be substituted by one or more halogen, nitro or alkyl groups, or a cyano radical,
X and Y are each independently hydrogen, halogen, alkyl, haloalkyl, phenyl or halophenyl or X and Y together with the —CH=CH— group standing between them are a benzene ring.

The invention also provides a process for the production of a compound of Formula I in which in the presence of a strongly polar diluent and a strong base, an imidazole of the formula

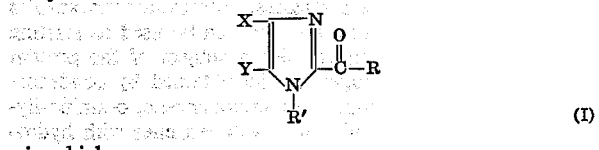

(III)

is reacted with a compound of the formula

R''—CO—Z     (IV)

in which
X, Y and R' have the meanings set forth hereinabove,
R'' is halogen, halocarbonyl, halocarbonylmethyl or halocarbonylphenyl, or has the same meaning as R in Formula I and
Z is halogen.

It is very surprising that in this process 2-acylimidazoles are obtained in simple manner and in good yields without side reactions occuring, such as acylations in 4 and 5 position.

If 1-methylimidazole and benzoyl chloride are used as starting materials, the course of the reaction according to the invention can be represented by the following formula scheme:

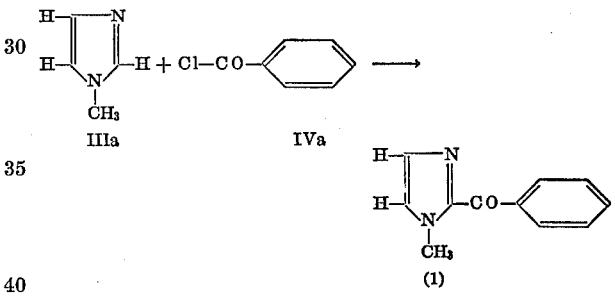

In the several foregoing formulae, desirably R is a tertiary alkyl radical with 4–6 carbon atoms, or a chloro-, fluoro-, bromo-, nitro- or amino-alkyl radical with 1–6 carbon atoms; or lower alkoxy, lower alkylthio or di-lower alkylamino radical preferably with 1–4 carbon atoms in each alkyl group; or a phenoxy or phenylthio radical; or a phenyl, biphenyl, naphthyl, cycloalkyl or cycloalkenyl with 5 or 6 carbon atoms, pyridyl, pyrazolyl, oxazolyl, thiadiazolyl or furyl radical optionally substituted by one or more chlorine, fluorine, bromine, nitro, amino, lower alkyl or alkoxy preferably with 1–4 carbon atoms, or hydroxy groups; or a group of Formula II; R' is an alkyl radical with 1–6 carbon atoms, cyano, or a phenyl or benzyl radical which may be substituted by chlorine, nitro or methyl; X and Y are hydrogen, chlorine, fluorine, bromine, or lower alkyl preferably having 1–4 carbon atoms, or phenyl radical which may be substituted by chlorine, fluorine or bromine, or X and Y together with the —CH=CH— group standing between them are a benzene ring.

Preferably, also, Z is chlorine or the radical

R—CO—O in which R has the same meaning as in the last paragraph above.

As typical examples of compounds of the formula (IV), already known in the art, there are listed: carbonic acid dichloride, oxalyl dichloride, trifluoroacetyl chloride, trichloroacetyl chloride, tert. butyryl chloride, chloroformic acid ethyl ester, chloroformic acid phenyl ester, chlorothioformic acid S-ethyl ester, dimethylcarbamoyl chloride, benzoyl chloride, p-chlorobenzoyl chloride, o-fluorobenzoyl chloride, chlorothioformic acid S-phenyl ester, benzoyl chloride, p-chlorobenzoyl chloride, o-fluorobenzoyl chloride, m-bromobenzoyl chloride, p-iodobenzoyl chloride, 3,5-dichlorobenzoyl chloride, 4-nitrobenzoyl chloride, o-methoxybenzoyl chloride, dimethylanthranyl chloride hydrochloride, 1-naphthylcarboxylic acid chloride, 4-pyridinecarboxylic acid chloride hydrochloride, 2-furylcarboxylic acid chloride, 2-thienylcarboxylic acid chloride, 2-chloro-6-methyl-pyridyl-4-carboxylic acid chloride, phthalyl dichloride, 1,5-dimethyl-pyrazolyl-3-carboxylic acid chloride, 3,4-dichlorofuryl-2-carboxylic acid chloride, and the like.

The imidazole suitable for carrying out the reaction according to the invention are clearly defined by the Formula III mentioned above, and are known in the art. As examples of the imidazoles to be used, there are listed: N-methylimidazole, N-phenylimidazole, N-benzylimidazole, N-methyl-4,5-dichloroimidazole, N-cyanoimidazole; further, N-p-chlorophenylimidazole, N-3,4-dichlorophenylimidazole, N - 4 - chlorobenzylimidazole, N-2,4-dinitrophenylimidazole, N-2-methyl-4,6-dinitrophenylimidazole.

The reaction according to the invention must be carried out in the presence of at least one strongly polar diluent. By strongly polar diluents there are meant, for the purposes of the present invention, inert organic solvents which have a dielectric constant of at least 4.8 (chloroform), preferably of at least 20.7 (acetone). These solvents include amides, such as dimethyl formamide; nitriles, such as acetonitrile, and sulfones, such as dimethylsulfone.

Moreover, it is necessary that the reaction according to the invention be carried out in the presence of at least one strong base. For the purposes of the present invention, by strong bases are meant all organic bases which have a $pK_b$ less than 8.7, preferably less than 3.3. These include, in the main, aliphatic amines such as triethylamine, trimethylamine, or heterocyclic tertiary amines such as α-picoline, lutidines, and the like.

The reaction temperatures can be varied within a wide range. In general, the reaction is carried out at 0 to 50° C., preferably 10 to 30° C.

When carrying out the process according to the invention, the starting materials and the strong base are normally used in approximately equimolar amounts. In the case where R in the general formula stands for the group of the Formula II, approximately 2.4 moles of imidazole derivative are normally reacted with each mole of the compound of the Formula IV. In this case, approximately 2 moles of strong base are normally necessary. The working up of the reaction mixture obtained may take place in customary manner.

The acylimidazoles of the invention can be used as intermediates for the preparation of crop protection agents, such as fungicides and growth regulators. Thus, the 2-acylimidazoles, with physiologically compatible acids, such as hydrohalogen acids, phosphoric acids, sulphonic acids, aliphatic mono-, di- and hydroxy-carboxylic acids, form salts which are effective against apple scab (*Fusicladium dendriticum*). Further, the acylimidazoles of the present invention can be used for the preparation of compounds which are effective against Protozoa. (compare the German patent application P 19 11 646.2, filed Mar. 7, 1969.)

The preparation of the new compounds of the present invention are illustrated, without limitation, by the following examples.

EXAMPLE 1

Benzoyl-1-methylimidazole

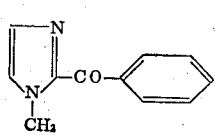

(1)

82 g. (1 mole) of 1-methylimidazole are dissolved in 1000 ml. acetonitrile and, after addition of 141 g. (1 mole) of benzoyl chloride and 101 g. (1 mole) of triethylamine at 0°, the mixture is stirred at 20° C. for 10 hours. The triethyl ammonium chloride formed is removed by filtration, the filtrate is heated to evaporate the solvent, the residue is dissolved in benzene, the benzene solution is washed salt-free, dried and evaporated. The resulting oil is distilled in a high vacuum. B.P. 136–145° C./0.3 mm. Hg, $n_D^{20}$ 1.6138, M.P. 50° C. Yield 108 g.

EXAMPLE 2

2-p-chlorobenzoyl-1-methylimidazole

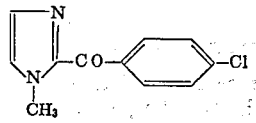

(2)

82 g. (1 mole) of 1-methylimidazole are dissolved in 500 ml. of acetonitrile and, at 0° C., there are added first 175 g. (1 mole) of p-chlorobenzoyl chloride, and then 101 g. (1 mole) of triethylamine, and stirring is effected for 15 hours at 20° C. After the triethylammonium chloride has been filtered off, the solvent is evaporated and the residue, after dissolution in benzene, is washed salt-free. The dried benzene solution is evaporated and the resulting crystals are recrystallized from cyclohexane. M.P. 70° C., yield 95 g.

EXAMPLE 3

(3)

2-o-fluorobenzoyl-1-methylimidazole is prepared analogously with Example 2, M.P. 95° C.

EXAMPLE 4

2-p-nitrobenzoyl-1-methylimidazole (4)

41 g. (0.5 mole) of 1-methylimidazole are dissolved in 800 ml. of acetonitrile, 92.8 g. (0.5 mole) of p-nitrobenzoyl chloride are added, and 50.5 g. (0.5 mole) of triethylamine are added dropwise at 0° C. After 20 hours the resultant crystal slurry is suction filtered and washed salt free and dried, M.P. 168° C.

EXAMPLE 5

2-ethoxycarbonyl-1-methylimidazole (5)

82 g. of 1-methylimidazole are dissolved in 600 ml. of acetonitrile, 108.5 g. of chloroformic acid ethyl ester are added, with cooling, and 101 g. of triethylamine are added dropwise at 0° C. After the triethylammonium chloride has been filtered off, the solvent is evaporated, the residue is taken up in methylene chloride and the solvent is evaporated. The crude product is purified by distillation in a high vacuum. B.P. 100–110° C./0.5 mm. Hg, 41 g.; $n_D^{20}$ 1.5086, M.P. 50° C.

EXAMPLE 6

2-benzoyl-1-phenylimidazole

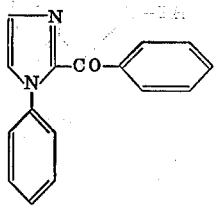
(6)

28.8 g. of 1-phenylimidazole are dissolved in 300 ml. of acetonitrile, 28.1 g. of benzoyl chloride are added, with cooling, and 20.2 g. of triethylamine are added dropwise at 0° C. After 15 hours, the triethylammonium chloride is filtered off and the solvent is evaporated. The residue is taken up in benzene, washed salt-free, evaporated again, and distilled in a high vacuum. B.P. 170–180° C./0.1 mm. Hg, $n_D^{20}$ 1.6044.

EXAMPLE 7

2-trichloroacetyl-1-methylimidazole

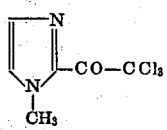
(7)

41 g. of 1-methylimidazole are dissolved in 600 ml. of acetonitrile, 91 g. of trichloroacetyl chloride and 50.5 g. of triethylamine are slowly added dropwise at 0° C., and, after 15 hours, the triethylammonium chloride is filtered off, the solvent is evaporated and the residue is taken up in benzene. The benzene solution is washed salt-free and evaporated, and the crude product is purified by distillation in a high vacuum. B.P. 128–140° C./0.2 mm. Hg; M.P. 74° C.

EXAMPLE 8

2-(4'-pyridyl)-carbonyl-1-methyl-imidazole

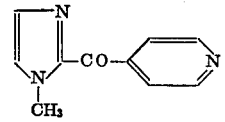
(8)

40.5 g. (0.5 mole) of 1-methylimidazole are dissolved in 600 ml. of acetonitrile, and a suspension of 89 g. (0.5 mole) of 4-pyridyl-carboxylic acid chloride hydrochloride is added. 101 g. (1 mole) of triethylamine is then added dropwise. After 15 hours, the triethylammonium chloride is filtered off with suction and the filtrate is evaporated. The residue is taken up in methylene chloride, washed once with a little water, dried, evaporated, and recrystallized from benzene with the use of activated charcoal. Yield 30 g., M.P. 136° C. In analogous manner, there are obtained:

TABLE

| Example No. | | Physical properties |
|---|---|---|
| (9) | 2-p-fluorobenzoyl-1-methylimidazole | M.P. 70° C. |
| (10) | 2-o-chlorobenzoyl-1-methylimidazole | M.P. 100° C. |
| (11) | 2-m-chlorobenzoyl-1-methylimidazole | M.P. 54° C. |
| (12) | 2-p-chlorobenzoyl-1-phenylimidazole | M.P. 141° C. |
| (13) | 2-(2'-furyl)-carbonyl-1-methylimidazole | M.P. 56° C. |
| (14) | 2-(α,α,α-trimethyl)-acetyl-1-methylimidazole | B.P. 110° C./24 mm. Hg. |
| (15) | 2-(2'-chloro-6'-methyl-4'-pyridyl)-carbonyl-1-methylimidazole | M.P. 156° C. |
| (16) | 2-(1',5'-dimethylpyrazolyl-3')-carbonyl-1-methylimidazole | M.P. 84° C. |
| (17) | 2,2'-oxalyl-bis-(1-methylimidazole) | M.P. 148° C. |
| (18) | 2-(3',4'-dichlorofuryl-2')-carbonyl-1-methylimidazole | M.P. 181° C. |
| (19) | 2-p-chlorobenzoyl-1-cyanimidazole | M.P. 200° C. |
| (20) | 2-m-chlorobenzoyl-1-phenylimidazole | B.P. 190° C./0.25 mm. Hg. |
| (21) | 2-m-fluorobenzoyl-1-phenylimidazole | B.P. 160° C./0.04 mm. Hg. |
| (22) | 2-p-fluorobenzoyl-1-phenylimidazole | M.P. 130° C. |
| (23) | 2-o-chlorobenzoyl-1-phenylimidazole | M.P. 98° C. |
| (24) | 2-(2',5'-dichlorobenzoyl)-1-methylimidazole | M.P. 133° C. |
| (25) | 2-m-nitrobenzoyl-1-methylimidazole | M.P. 132° C. |
| (26) | 2-(4'-chloro-3'-nitrobenzoyl)-1-methylimidazole | M.P. 146° C. |
| (27) | 2-(3'-methyl-4'-nitrobenzoyl)-1-methylimidazole | M.P. 133° C. |
| (28) | 2-(4'-methyl-3'-nitrobenzoyl)-1-methylimidazole | M.P. 135° C. |
| (29) | 2-(4'-phenyl-benzoyl)-1-methylimidazole | M.P. 124° C. |
| (30) | 2-(4'-tert.-butylbenzoyl)-1-methylimidazole | M.P. 58° C. |
| (31) | 2-(3'-methylbenzoyl)-1-methylimidazole | B.P. 144° C./0.2 mm. Hg. |
| (32) | 2-(cyclohexene-1'-carbonyl)-1-methylimidazole | B.P. 142° C./0.15 mm. Hg. |
| (33) | 2-(4'-methyl-1',2',3'-thiadiazolyl-carbonyl-2')-1-phenylimidazole | M.P. 183° C. |
| (34) | 2-(4'-chlorobenzoyl)-1-(2''-chlorobenzyl)imidazole | B.P. 220° C./0.2 mm. Hg. |
| (35) | 2-(3'-methyl-1',2'-oxazolylcarbonyl-5'-)-1-phenylimidazole | M.P. 135° C. |
| (36) | 2-(3'-chlorobenzoyl)-1-(4'''-chlorophenyl)imidazole | M.P. 104° C. |
| (37) | 2-(2'-chlorobenzoyl)-1-(4'''-chlorophenyl)imidazole | M.P. 158° C. |
| (38) | 2-(4'-nitrobenzoyl)-1-(4'''-chlorophenyl)imidazole | M.P. 142° C. |
| (39) | 2-(5'-methyl-1',2'-oxazolyl-carbonyl-3'-)-1-phenylimidazole | M.P. 118° C. |
| (A-01) | 2-(2'-furyl)-carbonyl-1-methyl-4-nitroimidazole | M.P. 136° C. |
| (A-02) | 2-(2'furyl)-carbonyl-5-chloro-1-methylimidazole | M.P. 96° C. |
| (A-03) | 2-(ethylthiocarbonyl)-1-methylimidazole | B.P. 120° C./4 mm. Hg. |
| (A-04) | 2-(phenoxycarbonyl)-1-methylimidazole | M.P. 142° C. |
| (A-05) | 2-(β-naphthoyl)-1-methylimidazole | B.P. 210° C./0.2 mm. Hg. |
| (A-06) | 2-(2'-thienylcarbonyl)-1-methylimidazole | M.P. 56° C. |
| (A-07) | Bis-(1-methyl-imidazolyl-2)-ketone | M.P. 151° C. |
| (A-08) | 2-(2'-furyl)-carbonyl-1-methylbenzimidazole | M.P. 128° C. |
| (A-09) | 2-(3'-methyl-1',2'-oxazolylcarbonyl-5'-)-1-methylimidazole | M.P. 133° C. |
| (A-10) | 2-(2'-methylbenzoyl)-1-methylimidazole | M.P. 68° C. |
| (A-11) | 2-(2'-methylbenzoyl)-1-phenylimidazole | M.P. 108° C. |
| (A-12) | 2-(5'-methyl-1',2'-oxazolylcarbonyl-3'-)1-methylimidazole | M.P. 133° C. |
| (A-13) | 2-(2,4-dichloro-benzoyl)-1-methylimidazole | M.P. 116° C. |
| (A-14) | 2-(2'-chlorobenzoyl)-1-cyanoimidazole | M.P. 174° C. |
| (A-15)L | 2-(3'-iodobenzoyl)-1-methylimidazole | B.P. 200° C./1.5 mm. Hg. |
| (A-16) | 2-(2'-furylcarbonyl)-1-benzylimidazole | M.P. 83° C. |
| (A-17) | 2-(2'-furylcarbonyl)-1-allylimidazole | B.P. 130° C./0.08 mm. Hg. |

TABLE—Continued

| Example No. | | Physical properties |
|---|---|---|
| (A-18) | 2-(2'-furylcarbonyl)-1-n-propylimidazole | B.P. 135° C./0.1 mm. Hg. |
| (A-19) | 2-(2'-furylcarbonyl)-1-methallylimidazole | B.P. 130° C./0.1 mm. Hg. |
| (A-20) | 2-(2'-chlorobenzoyl)-1-benzylimidazole | B.P. 180° C./0.07 mm. Hg. |
| (A-21) | 2-(4'-chlorobenzoyl)-1-benzoylimidazole | M.P. 82° C. |
| (A-22) | 2-(4'-chlorobenzoyl)-1-ethylimidazole | B.P. 180° C./0.2 mm. Hg. |
| (A-23) | 2-(4'-nitrobenzoyl)-1-ethylimidazole | M.P. 98° C. |
| (A-24) | 2-(4'-nitrobenzoyl)-1-n-propylimidazole | M.P. 64° C. |
| (A-25) | 2-(4'-chlorobenzoyl)-1-n-propylimidazole | B.P. 185° C./1.5 mm. |
| (A-26) | 2-(2'-furylcarbonyl)-1-ethylimidazole | B.P. 155° C./1.5 mm. Hg. |
| (A-27) | 2-(2'-chlorbenzoyl)-1-n-propylimidazole | B.P. 155° C./0.05 mm. Hg. |
| (A-28) | 2-(2'-chlorobenzoyl)-1-ethylimidazole | M.P. 50° C. |
| (A-29) | 2-(2'-furylcarbonyl)-1-methylbenzimidazole | M.P. 128° C. |
| (A-30) | 2-trichloracetyl-1-allylimidazole | M.P. 68° C. |
| (A-31) | 2-trichloracetyl-1-ethylimidazole | M.P. 61° C. |
| (A-32) | 2-trichloracetyl-1-methallylimidazole | M.P. 58° C. |
| (A-33) | 2-trichloracetyl-1-n-propylimidazole | M.P. 45° C. |

In a similar manner, there are also obtained:

2-(2'-nitroisobutyryl)-1-methylimidazole,
2-(2'-dimethylaminoisobutyryl)-1-methylimidazole,
2-(dimethylaminocarbonyl)-1-methylimidazole,
2-(phenylthiocarbonyl)-1-methylimidazole,
2-(4'-dimethylaminobenzoyl)-1-methylimidazole,
2-(2'-methoxybenzoyl)-1-methyl-imidazole,
2-benzoyl-1-(4'-nitrophenyl)-imidazole,
bis-(1-methylimidazolylcarbonyl-2)-methane,
2-(3'-chlorbenzoyl)-1-ethylimidazole,
2-(2'-fluorbenzoyl)-1-ethylimidazole,
2-(3'-fluorobenzoyl)-1-ethylimidazole,
2-(4'-fluorbenzyl)-1-ethylimidazole,
2-(3'-trifluorbenzoyl)-1-ethylimidazole,
2-(trifluoroacetyl)-1-methylimidazole,
2-(trifluoracetyl)-1-ethylimidazole,
2-(2',4'-dichlorbenzoyl)-1-ethylimidazole,
2-(2',6'-dichlorbenzoyl)-1-ethylimidazole,
2-(2',6'-dimethoxybenzoyl)-1-ethylimidazole,
2-(2',4'-dimethyl-6'-methoxybenzoyl)-1-ethylimidazole,
2-(2',4',6'-trimethylbenzoyl)-1-ethylimidazole,
2-(2'-chlorobenzoyl)-1-n-butylimidazole.

EXAMPLE 40

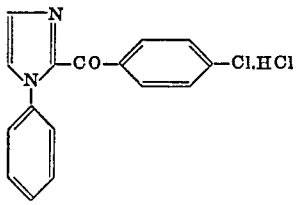

(40)

The compound according to the invention prepared according to Example 12 is dissolved in ether. Hydrogen chloride is then introduced at room temperature until saturation. After cooling to about 0° C., the hydrochloride precipitates; it is suction filtered and dried over phosphorus pentoxide. The melting point of the salt is 80° C.

EXAMPLE 41

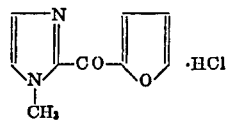

(41)

The hydrochloride is obtained from the compound prepared according to Example 13 and hydrogen chloride; the melting point is 190° C.

EXAMPLE 42

Application example: Fusicladium test/in vitro

The salts of the novel acylimidazoles according to the invention possess fungicidal properties, as a test on *Fusicladium dentriticum* (apple scab causative organism) shows.

The active compounds are applied in aqueous suspension of 0.0005% concentration; the germination of the spores of Fusicladium dentriticum is then observed and evaluated in accordance with the following scale:

0—denotes no infection
I—denotes very slight infection
II—denotes slight infection
III—denotes moderate infection
IV—denotes strong infection
V—denotes infection as in the case of the untreated control (no effect)

| Active compound | Result |
|---|---|
| 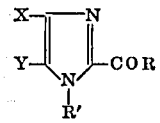 | I |
| (second structure shown) | 0 |

The other compounds of the present invention possess similar utility as well as being useful for further synthesis.

It will be appreciated that the instant specification and examples are set forth by way of illustration and not limitation, and that various modifications and changes may be made without departing from the spirit and scope of the present invention.

What we claim is:

1. A process for the production of an acylimidazole of the formula (I)

in which

R is tertiary alkyl of 4–6 carbon atoms; or chloro-, fluoro-, bromo-, nitro- or amino-alkyl of 1–6 carbon atoms; or lower alkoxy, lower alkylthio or di-lower alkylamino; or phenoxy or phenylthio; or phenyl, biphenyl, naphthyl, cycloalkyl of 5 to 6 carbon atoms, cycloalkenyl of 5 to 6 carbon atoms, pyridyl, pyrazolyl, oxazolyl, thiadiazolyl or furyl each optionally substituted by one or two members selected from the group consisting of chlorine, fluorine, bromine, nitro, lower alkyl or lower alkoxy; or a radical of the formula

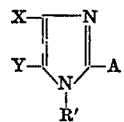 (II)

in which
A is a direct bond, —CO—, or COCH$_2$ or

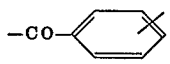

wherein the —CO— is attached to the imidazole,
R' is alkyl up to 6 carbon atoms which may be substituted by phenyl; or phenyl mono- or d-substituted with halogen, nitro or methyl or cyano, and
X and Y are each independently hydrogen, chlorine, fluorine, bromine or lower alkyl,
in which, in the presence of an inert organic solvent having a dielectric constant of at least about 4.8 and an approximately stoichiometric amount of an organic base having a pK$_b$ less than 8.7, an imidazole of the formula

 (III)

is reacted at a temperature of about 0 to 50° C. with a compound of the formula

 (IV)

the —COCl radical of which is attached directly to a carbon atom.

2. A process according to claim 1 in which the polar diluent in an inert organic solvent which has a dielectric constant of at least 20.7.

3. A process according to claim 2 in which the polar diluent is an amide, nitrile or sulphone.

4. A process according to claim 1 in which the strong base is an organic base with a pK$_b$ less than 3.3.

References Cited

UNITED STATES PATENTS

| | | | |
|---|---|---|---|
| 3,113,948 | 12/1963 | Zellner | 260—309.2 |
| 3,320,273 | 5/1967 | Kollonitsch | 260—309.2 |
| 3,325,507 | 6/1967 | Kollonitsch | 260—309 |
| 3,378,552 | 4/1968 | Henry | 260—309 |
| 3,515,728 | 6/1970 | Henry et al. | 260—309 |
| 3,590,047 | 6/1971 | Shen et al. | 260—309.2 |

OTHER REFERENCES

Parker: In: Raphael et al. Advances in Organic Chemistry, vol. 5, pp. 2–3 relied on (1965).

Aryuzina et al.: Chem. Abst., vol. 66, No. 94952z (1967).

Aryuzina et al.: Chem. Abst., vol. 69, No. 96572m (1968).

Boyer et al.: J. Amer. Chem. Soc., vol. 74, pp. 4506–8 (1952).

Kurihara et al.: Chem. Abst., vol. 55, columns 14439–40 (1961).

Takahashi et al.: Chem. Pharm. Bull., vol. 12, pp. 282–91 (1964).

Tertov et al.: Chem. Abst., vol. 60, column 8020 (1964).

Tertov et al.: Chem. Abst., vol. 69, No. 59158k (1968).

Hofmann: Imidazoles and Its Derivatives Part I, p. 127, New York, Interscience, 1953.

NATALIE TROUSOF, Primary Examiner

U.S. Cl. X.R.

260—294.9, 296 B, 302 D, 307 R, 309, 309.2, 310 R; 424—263, 270, 272, 273